United States Patent
Shiomi et al.

(10) Patent No.: US 6,344,820 B1
(45) Date of Patent: Feb. 5, 2002

(54) PASSIVE SSR SYSTEM

(75) Inventors: Kakuichi Shiomi, Kokubunji; Masami Ino, Tama; Kiyomi Imamiya, Kawasaki, all of (JP)

(73) Assignees: Electronic Navigation Research Institute, Chofu; Kabushiki Kaisha Toshiba, Kawasaki, both of (JP)

( * ) Notice: Subject to any disclaimer, the term of this patent is extended or adjusted under 35 U.S.C. 154(b) by 0 days.

(21) Appl. No.: 09/609,056

(22) Filed: Jun. 30, 2000

Related U.S. Application Data (63) Continuation of application No. PCT/JP99/06026, filed on Oct. 29, 1999.

(30) Foreign Application Priority Data

Oct. 30, 1998 (JP) .......................................... 10-311393

(51) Int. Cl.[7] ............................ G01S 7/40; G01S 13/74
(52) U.S. Cl. .......................... 342/174; 342/36; 342/37; 342/42; 342/43; 342/165; 342/173
(58) Field of Search ............................ 342/29, 30, 31, 342/32, 33, 34, 36, 37, 38, 39, 40, 41, 42, 43, 44, 45, 46, 47, 48, 49, 50, 51, 165–175, 195

(56) References Cited

U.S. PATENT DOCUMENTS

| | | | | |
|---|---|---|---|---|
| 5,063,386 A | * | 11/1991 | Bourdeau et al. | 342/40 |
| 5,198,823 A | | 3/1993 | Litchford et al. | |
| 6,094,169 A | * | 7/2000 | Smith et al. | 342/39 X |

FOREIGN PATENT DOCUMENTS

| | | |
|---|---|---|
| JP | 60-222782 | 11/1985 |
| JP | 63-298084 | 12/1988 |
| JP | 5-122025 | 5/1993 |
| JP | 5-142341 | 6/1993 |
| JP | 5-234000 | 9/1993 |
| JP | 63-266381 | 11/1998 |

OTHER PUBLICATIONS

International Search Report on PCT/JP99/06026, Dated Nov. 30, 1999.

* cited by examiner

*Primary Examiner*—Bernarr E. Gregory
(74) *Attorney, Agent, or Firm*—Oblon, Spivak, McClelland, Maier & Neustadt, P.C.

(57) ABSTRACT

A reply is received from aircrafts for calibration in response to an interrogation of SSR stations to detect transmission timing of the interrogation of the SSR stations and directly-facing timing of antennas of the SSR stations and thus detect a position of an arbitrary aircraft based on the transmission timing and directly-facing timing and the reply from the aircraft.

10 Claims, 11 Drawing Sheets

Y1-Y6: DETECTING POSITIONS OF AIRCRAFT WHEN SYNC IS CORRECT

B1-B6: DETECTING POSITIONS OF AIRCRAFT WHEN SYNC IS LOST (PSSR IS DETECTED IN REPETITIVE SYNCHRONIZATION SHORTER THAN ACTUAL)

A1-A6: DETECTING POSITIONS OF AIRCRAFT WHEN SYNC IS LOST (PSSR IS DETECTED IN REPETITIVE SYNCHRONIZATION LONGER THAN ACTUAL)

PASSIVE SSR SYSTEM

CROSS REFERENCE TO RELATED APPLICATIONS

This is a continuation of Application No. PCT/JP99/06026, filed Oct. 29, 1999.

This application is based upon and claims the benefit of priority from the prior Japanese Patent Application No. 10-311393, filed Oct. 30, 1998, the entire contents of which are incorporated herein by reference.

BACKGROUND OF THE INVENTION

This invention relates to a passive SSR (Secondary Surveillance Radar) system for monitoring the position of an aircraft by intercepting replies which an issued from the aircraft in response to an interrogation from SSR station.

As is well known, an aircraft in airborne is obliged to send out a desired information via a transponder when it receives an SSR interrogation from each of SSR stations located disposed in many places. Conventionally there is a passive SSR system for detecting the position of a desired aircraft upon receipt of both interrogation from SSR station and replies from the desired aircraft.

Figure 13:
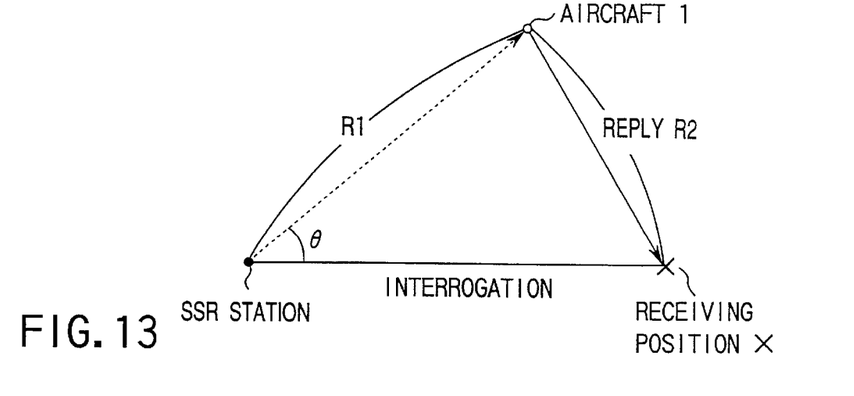
FIG. 13 is a diagram for explaining the problem of a conventional passive SSR system.

According to the detection principles of the above passive SSR system, if a distance between an SSR station and an aircraft is R1 and a distance from the aircraft to a receiving position X is R2 as shown in FIG. 13, the propagation time of interrogation and reply corresponds to the distances (R1+R2). In other words, an aircraft is located at one point on an ellipse whose two focuses correspond to the SSR station and the receiving position X and whose longer diameter corresponds to the distances (R1+R2), and the position of the aircraft on a two-dimensional plane is detected based on an angle θ between a straight line connecting the SSR station and the receiving position X and a straight line connecting the SSR station and the aircraft.

The above passive SSR system is under restrictions on use environment since it has difficulty in detecting the position of an aircraft when it is difficult for the system to receive an interrogation from an SSR station with high precision because of high mountains or buildings between the receiving point and the SSR station.

As described above, the problem of the conventional passive SSR system is that the position of an aircraft is difficult to detect unless the aircraft can intercept an interrogation from the SSR station.

The present invention has been developed in consideration of the above situation and its object is to provide a passive SSR system which is simple in configuration and capable of detecting the position of an aircraft with high precision without receiving any interrogation from an SSR station.

BRIEF SUMMARY OF THE INVENTION

A passive SSR system according to one aspect of the present invention comprises reply receiving means for receiving a reply issued from an aircraft in reply to an interrogation sent out from an SSR station, calibration means for detecting transmission timing of the interrogation sent out to the aircraft from the SSR station, antenna directly-facing timing of the SSR station, and interrogation patterns, based on the reply from the aircraft for calibration received by the reply receiving means, aircraft position detecting means for detecting a position of the aircraft based on the reply and the transmission timing and the antenna directly-facing timing of the SSR station detected by the calibration means, and monitor means for monitoring the position of the aircraft detected by the aircraft position detecting means.

In the passive SSR system described above, reply is received from an aircraft for calibration which is issued in reply to an interrogation from an SSR station, transmission timing of the interrogation from the SSR station and antenna directly-facing timing are detected based on the reply, and a position of the aircraft on a two-dimensional plane is detected based on the transmission timing, the antenna directly-facing timing and the reply from the aircraft. Consequently, the position of the aircraft can be detected with high precision even in a place where an interrogation is difficult to receive from the SSR station.

A passive SSR system according to another aspect of the present invention comprises reply receiving means for receiving a reply issued from an aircraft in reply to an interrogation sent out from an SSR station, calibration means for specifying the aircraft, which sends out the reply to the reply receiving means, based on aircraft position information from ADS (Automatic Dependent Surveillance), and detecting transmission timing of the interrogation sent out to the aircraft from the SSR station, directly-facing timing of an antenna of the SSR station, and interrogation patterns, based on the reply, a site of the SSR station and the aircraft position information, which are stored in advance, aircraft position detecting means for detecting a position of the aircraft based on the reply and the transmission timing and the directly-facing timing of the antenna of the SSR station, which are detected by the calibration means; and monitor means for monitoring the position of the aircraft detected by the aircraft position detecting means.

In the passive SSR system described above, while aircraft positional information is input from the ADS, an aircraft, which is sending out a reply in reply to an interrogation from an SSR station, is specified, and both transmission timing of the interrogation from the SSR station and directly-facing timing of an antenna of the SSR station are detected from a position of the aircraft and reception timing of the reply. Furthermore, time lag is obtained from time data of the reception timing of the reply and the aircraft position information, and the transmission timing of the interrogation from the SSR station and the directly-facing timing of the antenna are corrected based on data of the time lag, thereby detecting a position of the aircraft based on the transmission timing and directly-facing timing and the reply from the aircraft. Consequently, the position of the aircraft can be detected with high precision even in a place where an interrogation is difficult to receive from the SSR station.

A passive SSR system according to still another aspect of the present invention comprises reply receiving means for intercepting a reply issued from an aircraft in reply to an interrogation generated from an SSR station, calibration means for storing generation time information of the interrogation of the SSR station and directly-facing time of an antenna of the SSR station, which are preset, and detecting transmission timing of the interrogation sent out to the aircraft from the SSR station and antenna directly-facing timing of the SSR station based on time of a common clock, aircraft position detecting means for detecting a position of the aircraft based on the reply and the transmission timing and the antenna directly-facing timing of the SSR station, which are calculated by the calibration means, and the reply, and monitor means for monitoring the position of the aircraft detected by the aircraft position detecting means.

In the passive SSR system described above, both transmission timing of an interrogation of an SSR station and antenna directly-facing timing of the SSR station are detected based on generation time information of the interrogation of the SSR station and antenna directly-facing time information of the antenna, which are stored in advance, and time of a common clock, thereby detecting a position of the aircraft in reply to the transmission timing, antenna directly-facing timing, and the reply from the aircraft. Therefore, the position of the aircraft can be detected with high precision even in a place where an interrogation is difficult to receive from the SSR station.

The calibration means according to the present invention is so constituted that an aircraft, which is sending out a reply to the reply receiving means, is specified based on aircraft position information from ADS and transmission timing of the interrogation sent out to the aircraft from the SSR station is detected based on the reply, the aircraft position information, and the positional information of the SSR station.

According to the above constitution, time lag between the reply and aircraft position information is detected, the transmission timing is corrected based on the time lag, and at least transmission timing is detected by the corrected timing, with the result that higher precision transmission timing can be detected.

A passive SSR system according to yet another aspect of the present invention comprises reply receiving means for receiving a reply issued from an aircraft in reply to an interrogation sent out from an SSR station, calibration means for, upon externally receiving transmission time information of an interrogation of the SSR station and antenna directly-facing time information of the SSR station which are based on time of a common clock, correcting the transmission time information and the antenna directly-facing time information based on the time of the common clock, and detecting transmission timing of the interrogation sent out to the aircraft from the SSR station and antenna directly-facing timing of the SSR station, aircraft position detecting means for detecting a position of the aircraft based on the reply and the transmission timing and the antenna directly-facing timing of the SSR station detected by the calibration means, and monitor means for monitoring the position of the aircraft detected by the aircraft position detecting means.

In the passive SSR system described above, if generation time information of an interrogation of the SSR station and antenna directly-facing time information of the SSR station, which are based on the time of a common clock, is externally supplied, they are corrected by the time of the common clock to detect transmission timing of the interrogation sent out to the aircraft from the SSR station and antenna directly-facing timing of the SSR station and thus detect a position of the aircraft based on the transmission timing, antenna directly-facing timing and the reply from the aircraft. Consequently, the position of the aircraft can be detected with high precision even in a place where an interrogation is difficult to receive from the SSR station.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter embodiments of the present invention will be described in detail with reference to the drawings.

Figure 1:
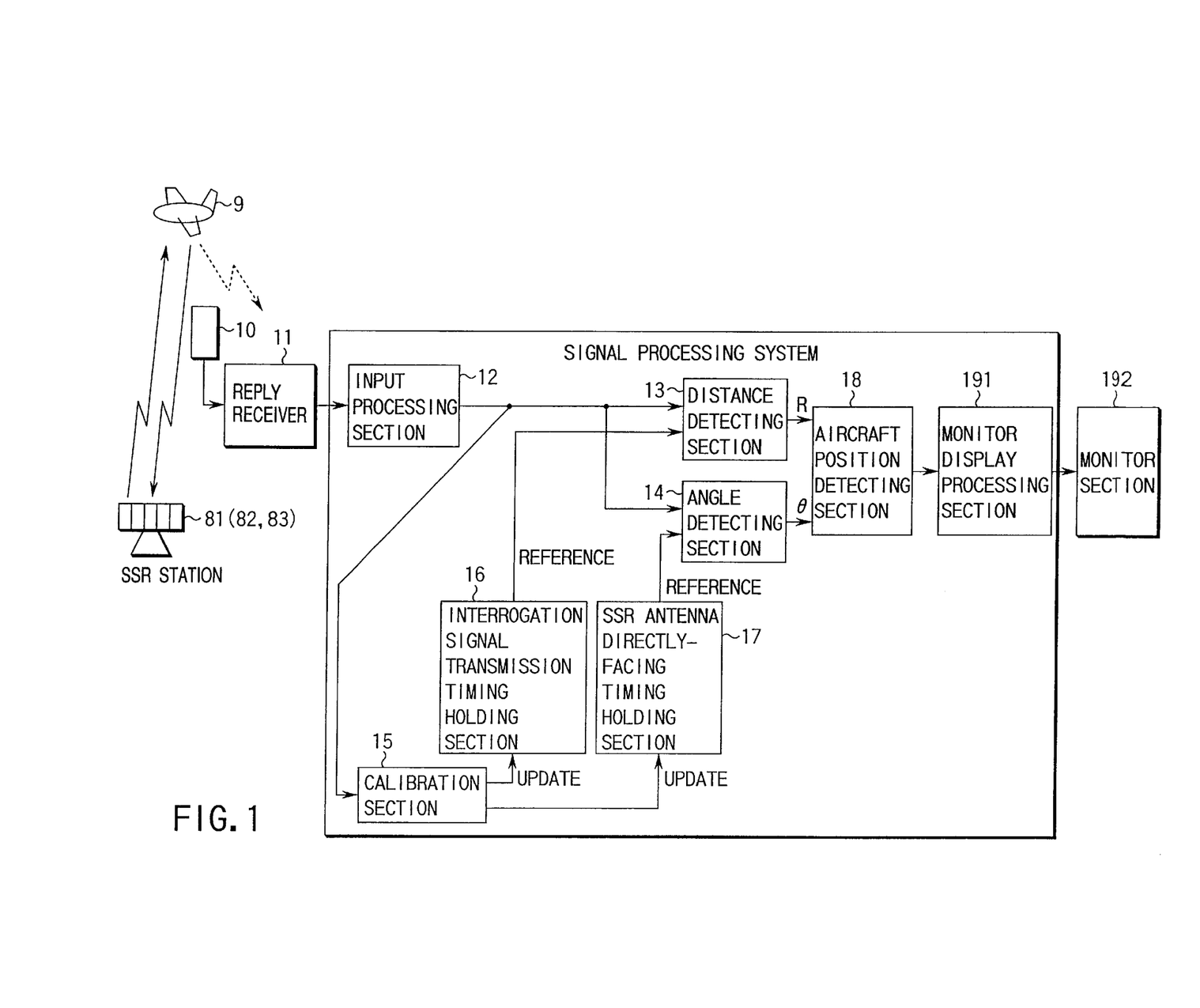
FIG. 1 is a block diagram showing a configuration of a passive SSR system according to one embodiment of the present invention.

FIG. 1 illustrates a passive SSR system according to one embodiment of the present invention, and a reply receiver 11 is connected to a receiving antenna 10. The receiving antenna 10 receives from an aircraft 9 a reply to an interrogation of an SSR station 81 (82, 83) and supplies it to the reply receiver 11. The reply receiver 11 is connected to an input processing section 12 of a signal processing system. One input terminal of each of a distance detecting section 13 and an angle detecting section 14 is connected to the output terminal of the input processing section 12, and the section 12 supplies the input reply to the distance detecting section 13 and angle detecting section 14.

A calibration section 15 is also connected to the output terminal of the input processing section 12. An interrogation transmission timing holding section 16 and an SSR antenna directly-facing timing holding section 17 are connected to the output terminal of the calibration section 15 and, as will be described later, the calibration section 15 generates interrogation transmission timing and antenna directly-facing timing and supplies them to the timing holding sections 16 and 17, respectively. These sections 16 and 17 hold the input interrogation transmission timing and antenna directly-facing timing.

The other input terminal of the above distance detecting section 13 is connected to the output terminal of the interrogation transmission timing holding section 16, and the section 16 supplies an input transmission timing signal to the distance detecting section 13. The output terminal of the distance detecting section 13 is connected to an aircraft position detecting section 18, and the section 13 detects a distance between the SSR station 81 (82, 83) and the aircraft 9 for monitoring based on the input reply and interrogation transmission timing, and supplies it to the aircraft position detecting section 18.

On the other hand, the output terminal of the SSR antenna directly-facing timing holding section 17 is connected to the other input terminal of the above angle detecting section 14, and the section 17 supplies an input antenna directly-facing timing signal to the angle detecting section 14. The output terminal of the angle detecting section 14 is connected to the above aircraft position detecting section 18, and the section 14 detects an angle θ and a distance R of the aircraft based on the input reply and antenna directly-facing timing signal and supplies them to the aircraft position detecting section 18.

Incidentally the antenna directly-facing timing refers to a state in which an antenna of the SSR station rotating in one direction directly faces the passive SSR system. In the passive SSR system, a direction of the aircraft viewed from the SSR station is detected based on a time difference between the antenna directly-facing timing and the receiving timing of the reply from the aircraft.

A monitor display processing section 191 is connected to the output terminal of the aircraft position detecting section 18, and the section 18 generates image data based on the input distance information and angle information of the aircraft 9 and supplies it to the monitor display processing section 191. A monitor section 192 is connected to the output terminal of the monitor display processing section 191, and the section 191 processes input position display image data to generate a desired aircraft image and supplies it to the monitor section 192. The monitor section 192 thus displays the aircraft image.

The foregoing calibration section 15 will now be described in detail. For example, in the calibration section 15 shown in FIG. 2, a reply is input to a signal detecting section 151 through the above input processing section 12. Upon detecting that six replies are input from two aircrafts A and B flying over preset SSR stations 81, 82 and 83, in response to interrogations from the SSR stations, the signal detecting section 151 supplies the six replies to a calculating section 152.

Figure 3:
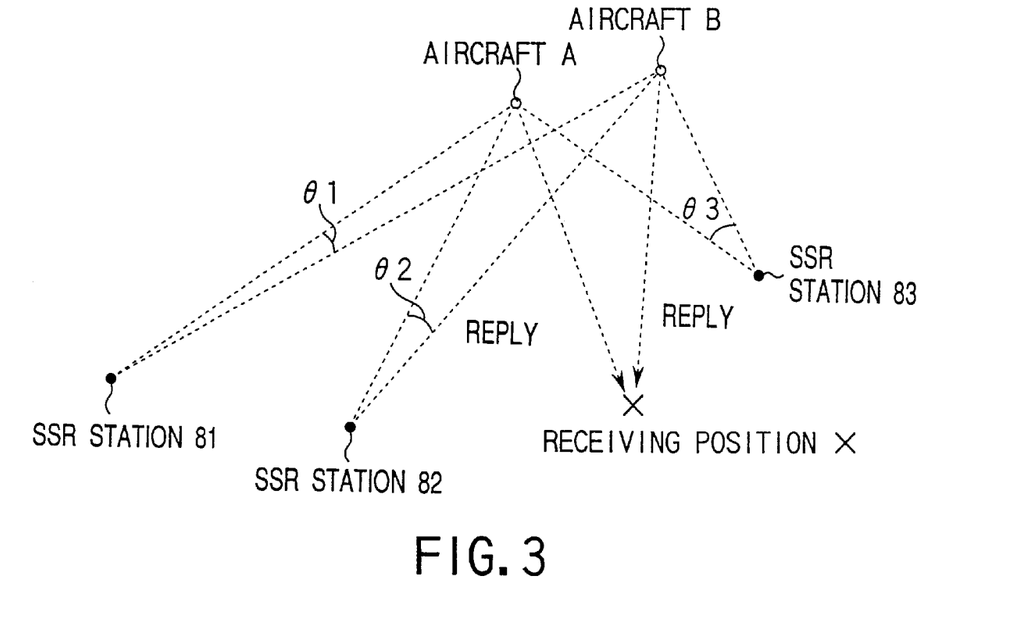
FIG. 3 is a diagram for explaining an operation of the calibration section shown in FIG. 2.
Figure 4:
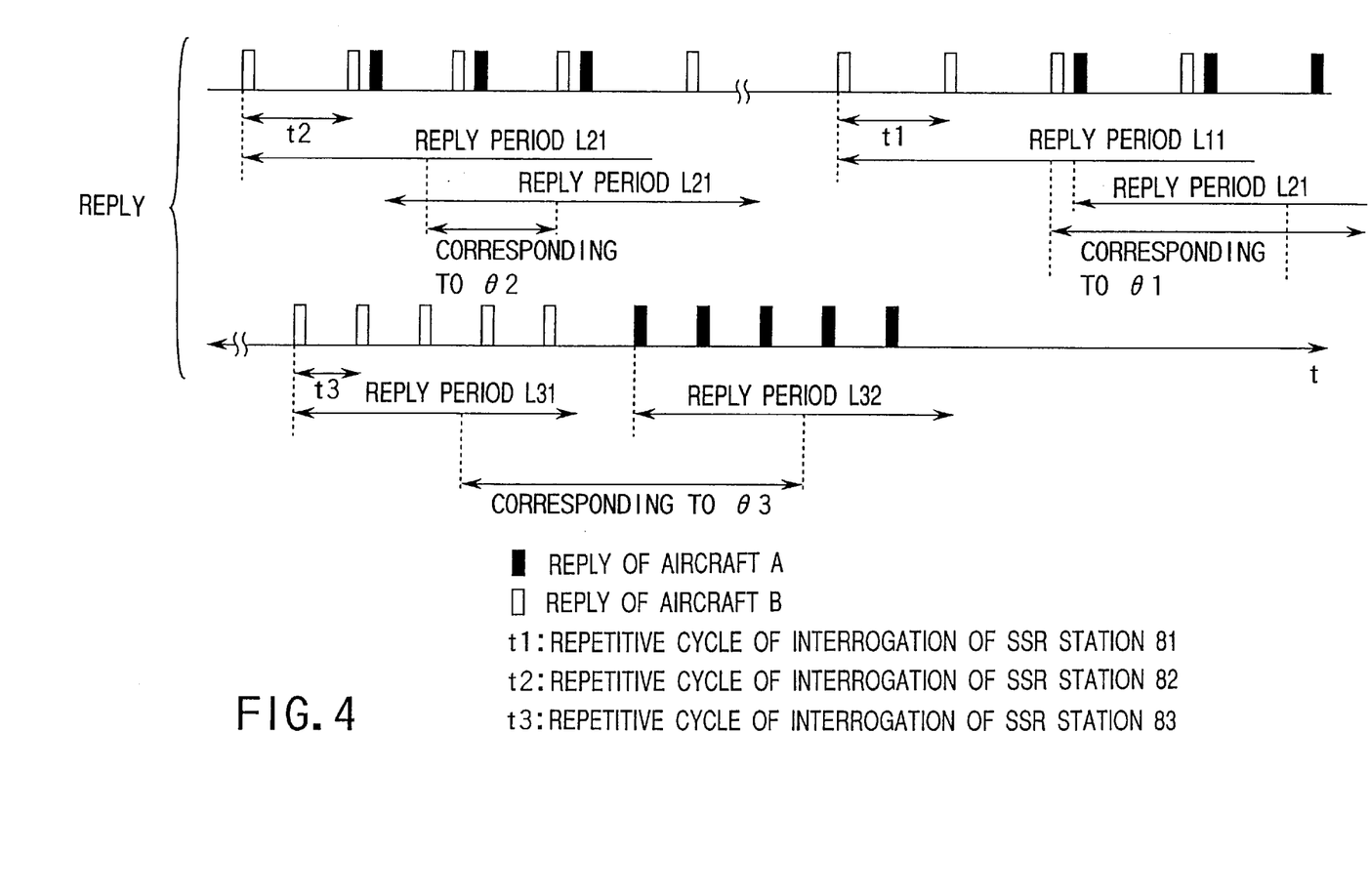
FIG. 4 is a chart of waveforms of replies to be processed in the calibration section shown in FIG. 2.

The calculating section 152 stores positional information of each of the SSR stations 81, 82 and 83 and repetitive cycles t1, t2 and t3 of the interrogations from the SSR stations 81, 82 and 83, and the replies are input from the aircrafts A and B in response to the interrogations from the SSR stations 81, 82 and 83 (see FIG. 3). If, as shown in FIG. 4, the periods of responses of aircrafts A and B to the interrogations from the SSR stations 81, 82 and 83 are L11, L12, L21, L22, L31 and L32, the calculating section 152 detects an angle θ1 between a line connecting the SSR station 81 and the aircraft A and a line connecting the SSR station 81 and the aircraft B, based on the replies of the aircrafts A and B to the SSR station 81, the angle θ1 corresponding to a range from nearly the middle of the reply period L11 to nearly the middle of the reply period L12.

An angle θ2 between a line connecting the SSR station 82 and the aircraft A and a line connecting the SSR station 82 and the aircraft B, corresponds to a range from nearly the middle of the reply period L21 to nearly the middle of the reply period L22. Similarly, the angle θ2 is calculated based on the replies of the aircrafts A and B to the SSR station 82.

An angle θ3 between a line connecting the SSR station 83 and the aircraft A and a line connecting the SSR station 83 and the aircraft B, corresponds to a range from nearly the middle of the reply period L31 to nearly the middle of the reply period L32. Similarly, the angle θ3 is calculated based on the replies of the aircrafts A and B to the SSR station 83.

Figure 2:
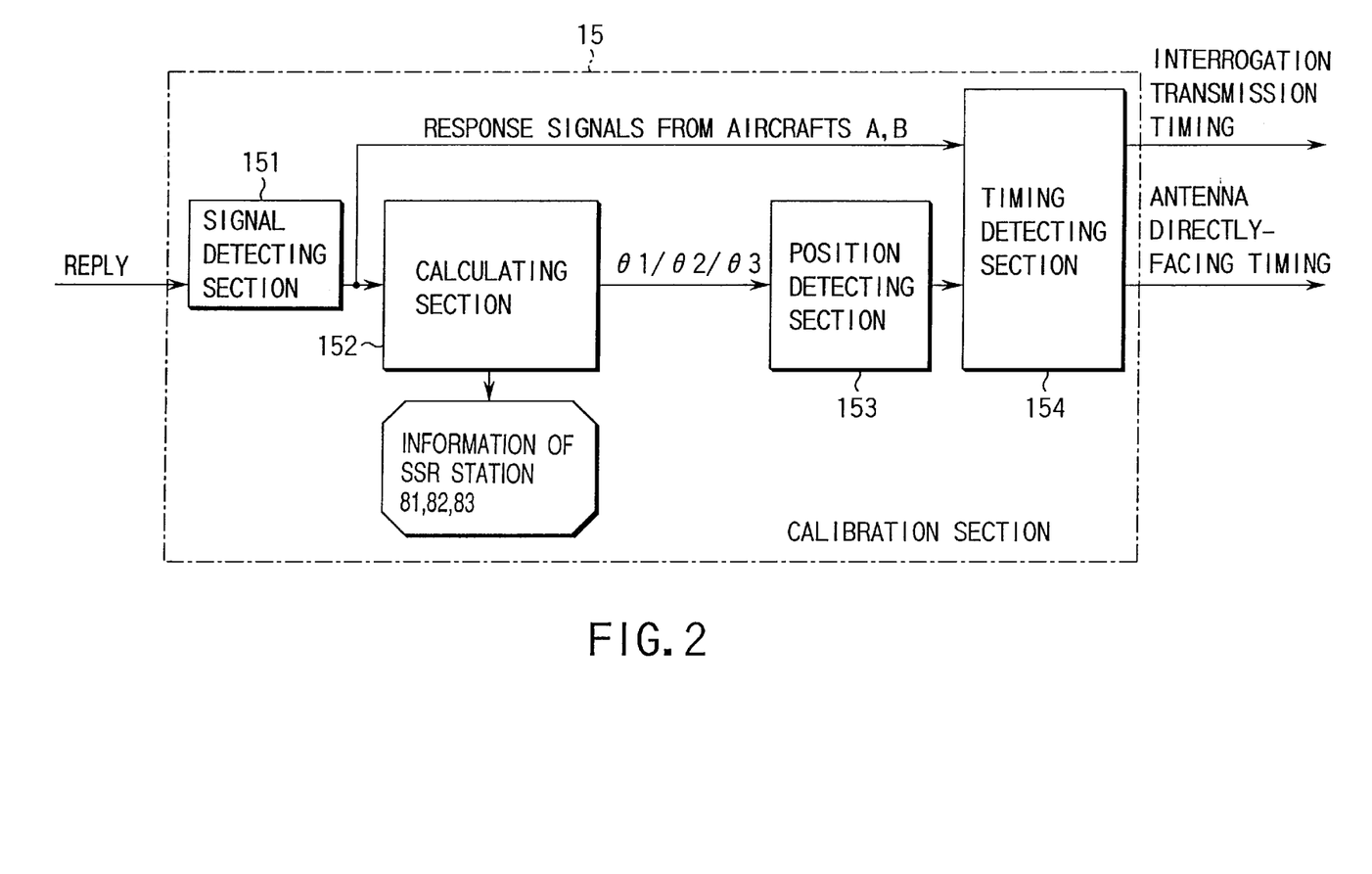
FIG. 2 is a block diagram of a calibration section of the passive SSR system shown in FIG. 1.

A position detecting section 153 is connected to the above calculating section 152, and the section 152 supplies the calculated angle (θ1 to θ3) information to the position detecting section 153. The position detecting section 153 detects positions of the aircrafts A and B based on the input angle (θ1 to θ3) information and supplies it to a timing detecting section 154. The output terminal of the above signal detecting section 151 is connected to the timing detecting section 154, and the section 154 detects transmission timing and antenna directly-facing timing of each of the SSR stations 81, 82 and 83 based on the positional information of the aircrafts A and B and the replies therefrom and then supplies them to the above interrogation transmission timing holding section 16 and SSR antenna directly-facing timing holding section 17.

Upon receiving replies issued from the two aircrafts A and B in response to the interrogations of the SSR stations 81, 82 and 83, the above calibration section 15 generates interrogation timing and antenna directly-facing timing and supplies them to the interrogation transmission timing holding section 16 and SSR antenna directly-facing timing holding section 17, thereby updating timing information.

The foregoing calibration section 15 is so constituted as to perform calibration using the two aircrafts A and B and the SSR stations 81, 82 and 83 whose positional information and interrogation repetitive cycles are known. However, the constituting elements of the calibration section is not limited to the above number.

The above passive SSR system is so configured as to receive replies for calibration issued from the aircrafts A and B in response to interrogations of the SSR stations 81, 82 and 83, detect transmission timing of interrogations of the SSR stations and directly-facing timing of antennas thereof based on the replies and then detect the positions of the aircrafts on a two-dimensional plane based on the transmission timing and directly-facing timing and the reply from the aircraft 9. Thus, the position of the aircraft 9 to be monitored on the two-dimensional plane can be detected with high precision even in places where the interrogations of the SSR stations 81, 82 and 83 are difficult to receive, and the system can be improved in operability since it is not subjected to constraints on use environment.

As embodiments other than the above, the present invention may have calibration means as shown in FIGS. 5 to 12, and the same effects can be obtained from each of the embodiments. In FIGS. 5 to 12, the same components as those in FIGS. 1 to 4 are denoted by the same reference numerals and their descriptions are omitted.

Figure 5:
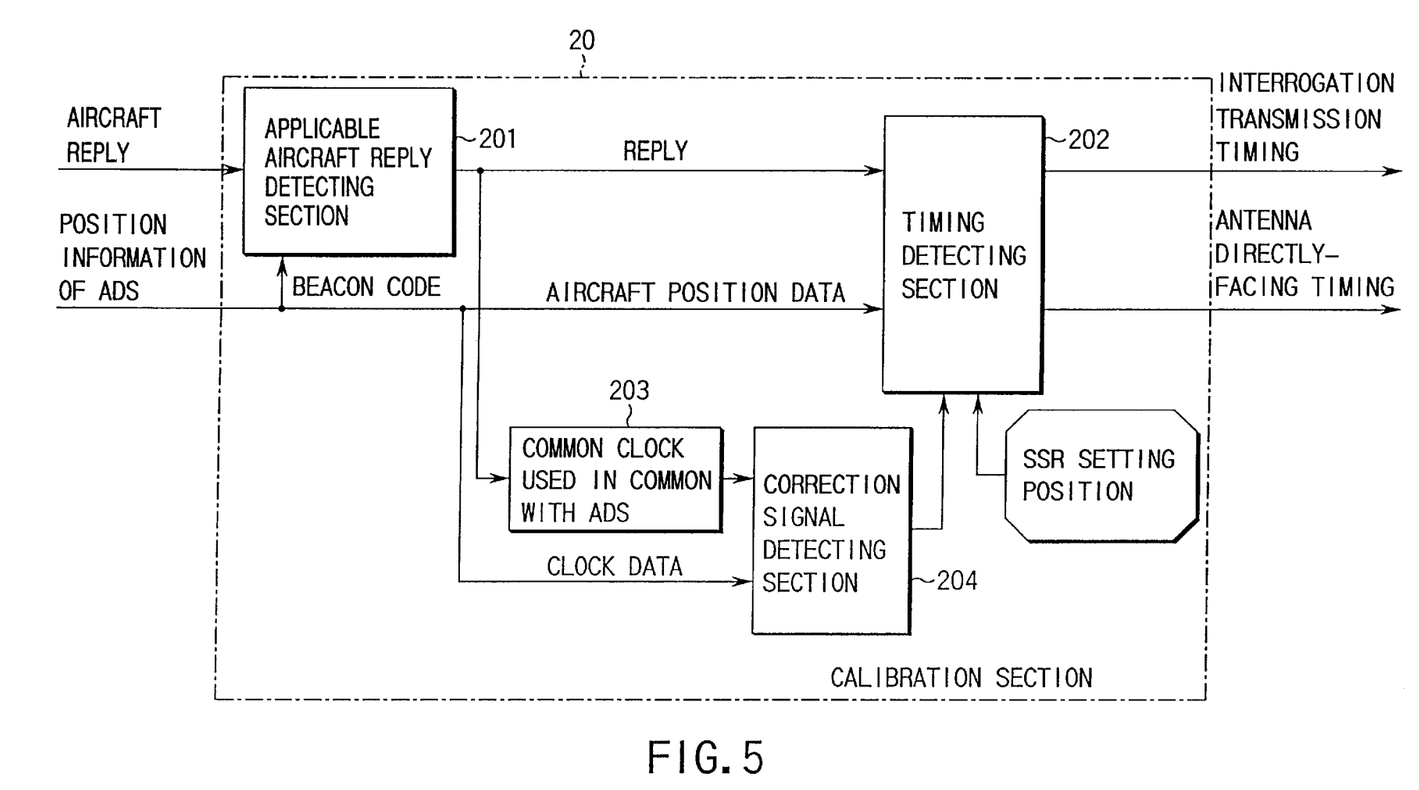
FIG. 5 is a block diagram illustrating another embodiment of the present invention.
Figure 6:
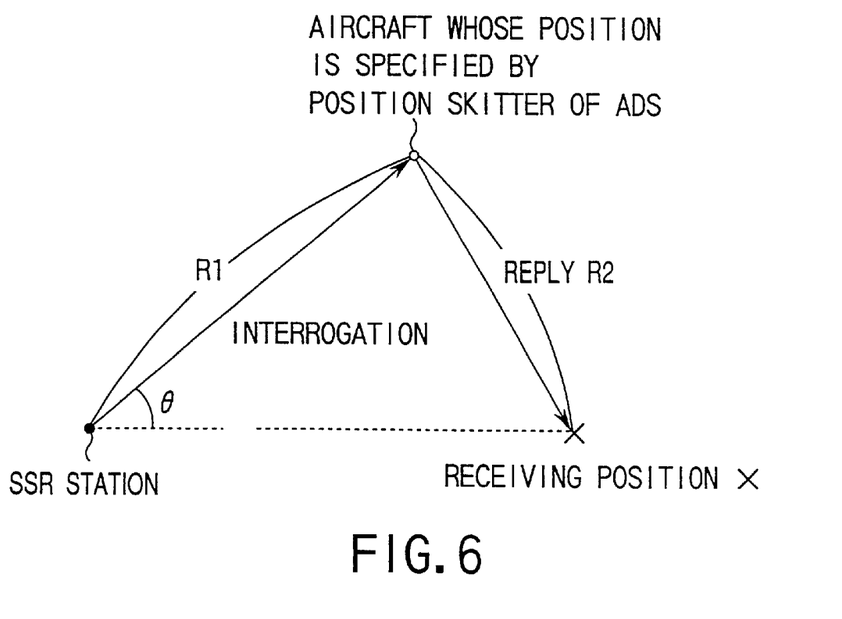
FIG. 6 is a diagram for explaining a processing operation of the embodiment shown in FIG. 5.
Figure 7:
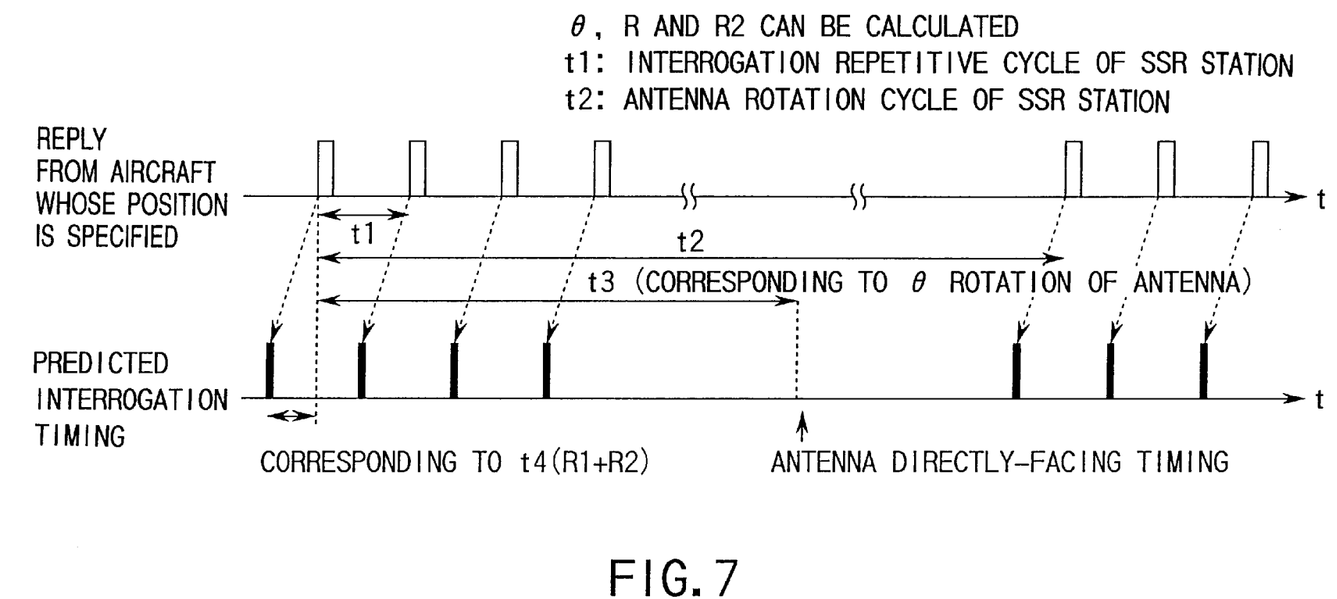
FIG. 7 is a chart of waveforms of replies to be processed in the embodiment shown in FIG. 5.

First, in the embodiment shown in FIGS. 5 to 7, an applicable aircraft reply detecting section 201 is provided in a calibration section 20 (see FIG. 5) and supplied with a reply to an interrogation of an SSR station from an aircraft from calibration through an input processing section 12 (see FIG. 6). At the same time, the positional information of the aircraft is input to the aircraft reply detecting section 201 from well-known ADS (Automatic Dependent Surveillance). A timing detecting section 202 is connected to the output terminal of the aircraft reply detecting section 201, and the section 201 specifies a reply of an aircraft based on the aircraft position data and supplies it to the timing detecting section 202.

The timing detecting section 202 is supplied with positional data of an SSR station, a reply and positional data of the aircraft, which are stored in advance. The received reply was sent out by the time of radio wave propagation ahead of the reception timing. The radio wave propagation time can be calculated from the positional information of the SSR station and aircraft and so can be the transmission timing of the interrogation.

A detecting section 204 is connected to the output terminal of the aircraft reply detecting section 201 via a common clock 203 used in common with the above ADS, such as a known GPS (Global Positioning System). The detecting section 201 detects an input reply and a target moving distance corresponding to a time lag of aircraft information acquired by the ADS, and outputs them to the correction signal detecting section 204. The section 204 generates a correction signal based on the movement of the aircraft corresponding to the time lag and supplies it to the above timing detecting section 202.

The timing detecting section 202 corrects transmission timing of the interrogation and antenna directly-facing timing, using the correction signal.

More specifically, the timing detecting section 202 is supplied with the reply specifying a position corresponding to the aircraft position data. The reply transmission timing is obtained as send-out timing of the interrogation of the SSR station which is before t4 in FIG. 7, and t4 corresponds to the propagation time of the interrogation and reply R1+R2.

The timing detecting section 202 determines an interrogation repetition period t2 of the SSR station from the transmission timing of the reply (presence or absence of a response) of the aircraft whose position is specified by the position skitter and, as shown in FIG. 6, obtains an angle θ based on the specified position of the aircraft, the position of the SSR station, and the receiving position X. Time t3 for which the antenna of the SSR station rotates through an angle of θ is determined on the basis of the period t2, and timing obtained by adding time t3 to transmission timing t4 of the reply is detected as antenna directly-facing timing.

This embodiment can be configured such that the interrogation transmission timing and antenna directly-facing timing are updated repeatedly while the aircraft position information of ADS is being input.

Figure 8:
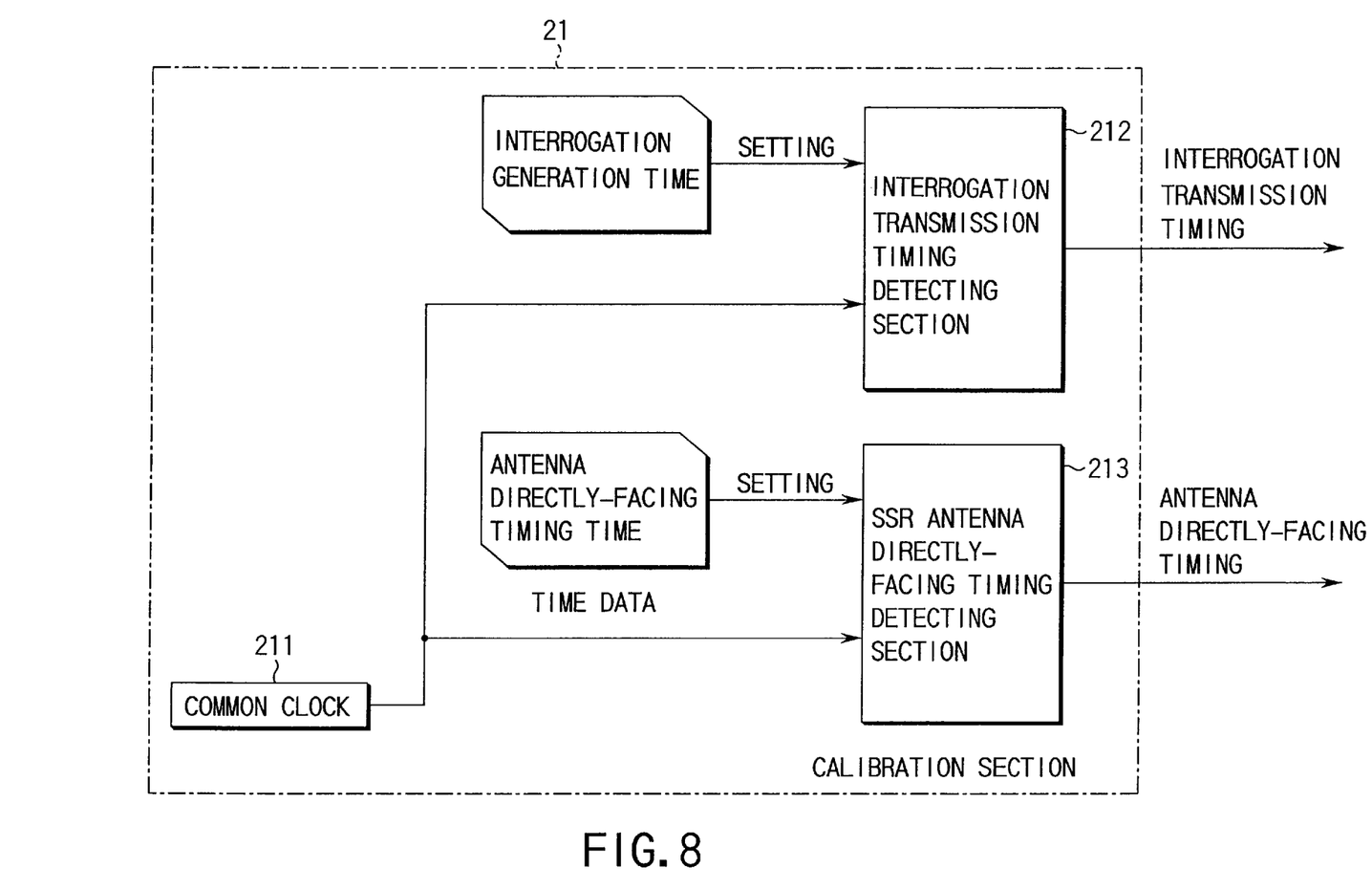
FIG. 8 is a block diagram illustrating still another embodiment of the present invention.

In the embodiment shown in FIG. 8, a calibration section 21 includes a common clock 211 such as a known GPS (Global Positioning System), and an interrogation transmission timing detecting section 212 and an SSR antenna directly-facing timing detecting section 213 are connected to the output terminal of the common clock 211. An interrogation transmission timing holding section 16 is connected to the output terminal of the interrogation transmission timing detecting section 212, while the above SSR antenna directly-facing timing holding section 17 is connected to the output terminal of the SSR antenna directly-facing timing detecting section 213.

The interrogation transmission timing detecting section 212, which stores known interrogation generation time information of an SSR station, generates interrogation transmission timing based on the interrogation generation time information and the input time data of a common clock and supplies it to the above interrogation transmission timing holding section 16.

The SSR antenna directly-facing timing detecting section 213, which stores antenna directly-facing timing time information of the above SSR station, generates antenna directly-facing timing based on the directly-facing timing information and the input time data of the common clock 211 and supplies it to the above SSR antenna directly-facing timing holding section 17.

Figure 9:
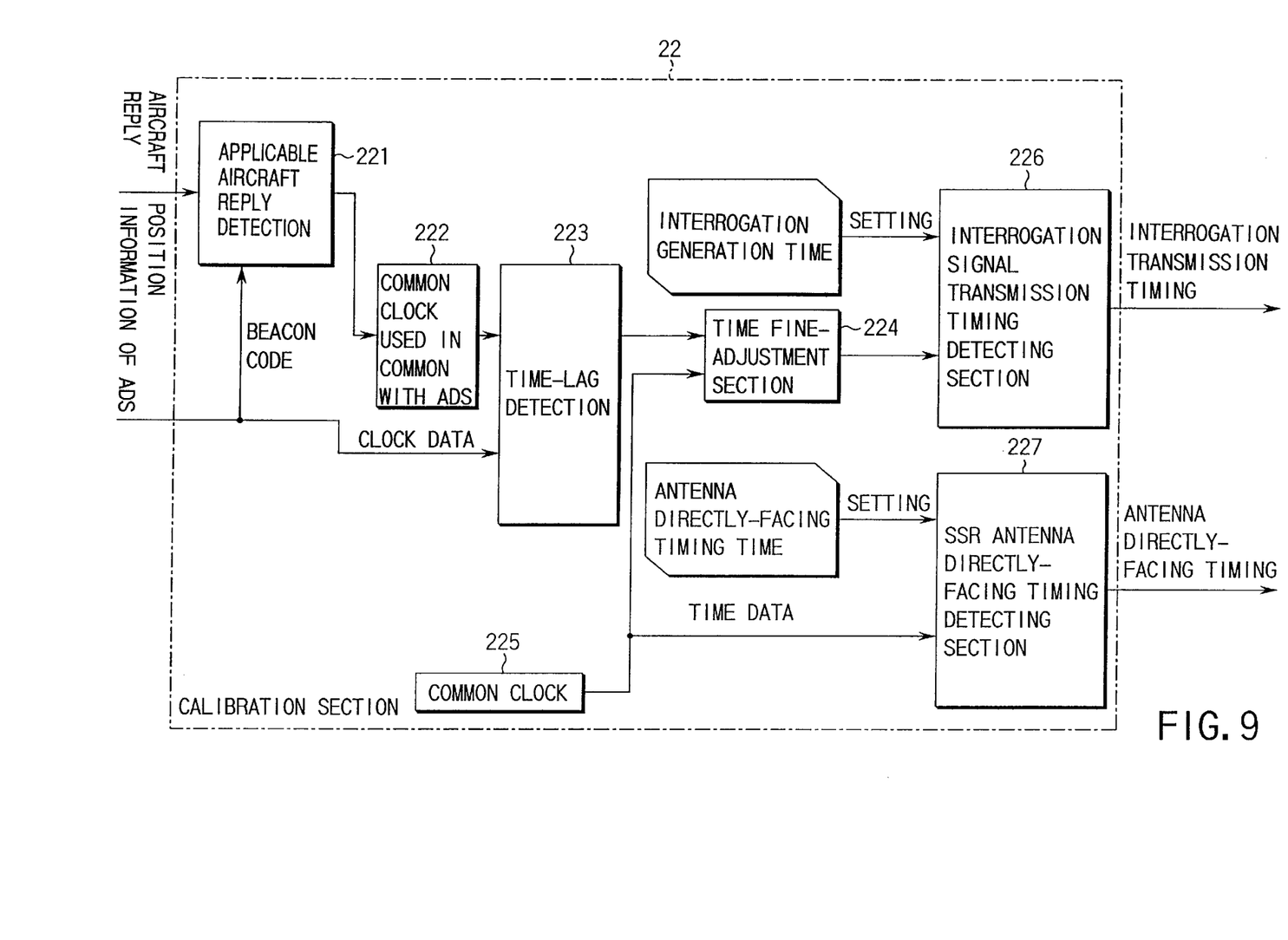
FIG. 9 is a block diagram illustrating still another embodiment of the present invention.

In the embodiment shown in FIG. 9, a calibration section 22 includes an applicable aircraft reply detecting section 221. The section 221 is supplied with a reply which is issued from an aircraft for calibration through an input processing section 12 in response to an interrogation of an SSR station. At the same time, the applicable aircraft reply detecting section 221 is supplied with positional information of the aircraft from the known ADS (Automatic Dependent Surveillance). One input terminal of a time-lag detecting section 223 is connected to the output terminal of the applicable aircraft reply detecting section 221 via a common clock 222 used in common with the ADS, such as the known GPS (Global Positioning System). The other input terminal of the time-lag detecting section 223 is supplied with aircraft position information from the above ADS, and the detecting section 223 detects time lag between time data of the aircraft position information and that of an input reply based on the common clock and generates a correction signal corresponding to the time lag.

A time fine-adjustment section 224 is connected to the output terminal of the time-lag detecting section 223. The output terminal of a common clock 225, such as the known GPS (Global Positioning System) is connected to the time fine-adjustment section 224. The section 224 corrects the time data of the common clock 225 based the correction signal and supplies the corrected data to an interrogation transmission timing detecting section 226.

The interrogation transmission timing detecting section 226, which stores known interrogation generation time information of an SSR station, generates interrogation transmission timing based on the interrogation generation time information and the output of the time fine-adjustment section 224 and supplies it to an interrogation transmission timing holding section 16.

An SSR antenna directly-facing timing detecting section 227 is connected to the output terminal of the common clock 225. The SSR antenna directly-facing detecting section 227, which stores antenna directly-facing timing time information of the above SSR station, generates antenna directly-facing timing based on the antenna directly-facing timing information and the input time data of the common clock 225 and supplies it to an SSR antenna directly-facing timing holding section 17.

This embodiment can be configured such that the interrogation transmission timing and antenna directly-facing timing are updated repeatedly while the aircraft position information of ADS is being input.

Figure 10:
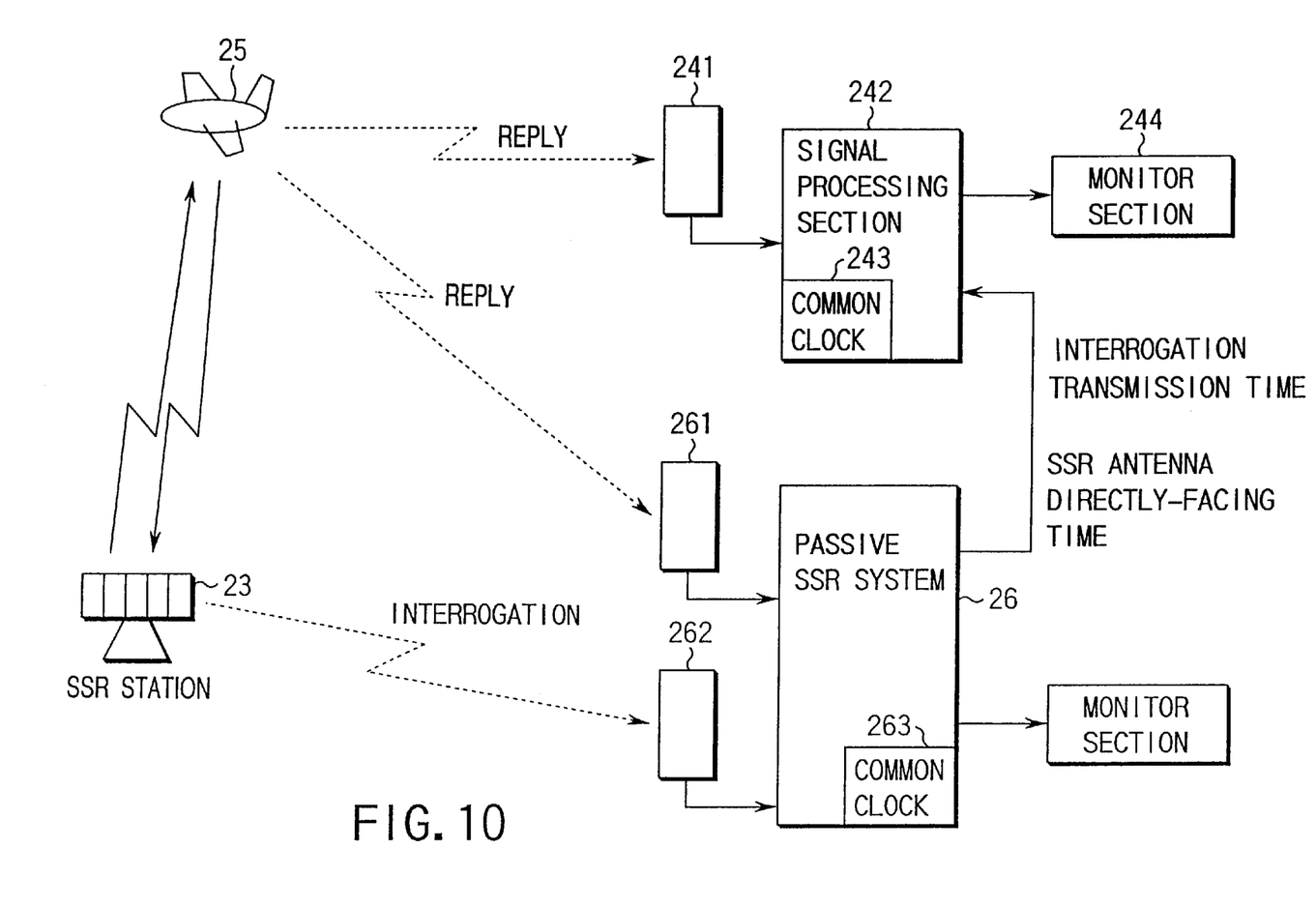
FIG. 10 is a block diagram illustrating yet another embodiment of the present invention.

Furthermore, in the embodiment shown in FIG. 10, a signal processing section 242 is connected to a reply receiving system 241 of an SSR station 23. The reply receiving system 241 receives a reply which is issued from an aircraft 25 in response to an interrogation of the SSR station 23 and guides it to the signal processing section 242.

The above signal processing section 242 includes a common clock 243 such as the known GPS (Global Positioning System) and is supplied with both transmission time of the interrogation from the SSR station 23 and antenna directly-facing time of the SSR station 23.

The signal processing section 242 generates interrogation transmission timing and antenna directly-facing timing based on the transmission time of the input interrogation of the SSR station 23, the antenna directly-facing time of the SSR station 23, and the time data of the common clock 243.

The signal processing section 242 acquires distances R1 and R2 and angle θ of the aircraft 25 based on the generated interrogation transmission timing and antenna directly-facing timing and the reply input through the reply receiving system 241 to detect a position of the aircraft, generate an aircraft image based on the position of the aircraft, and output the aircraft image to a monitor section 244, thus displaying the aircraft image on a monitor section 244.

The transmission time information of the interrogation from the SSR station 23 and the antenna directly-facing time information of the SSR station 23 are generated by converting interrogation transmission timing and antenna directly-facing timing, which are detected by another passive SSR system 26 having a reply receiving system 261 and an interrogation receiving system 262, based on time data of a common clock 263 such as the known GPS (Global Positioning System), and supplied to the signal processing section 242 through the above communication means (not shown).

Figure 11:
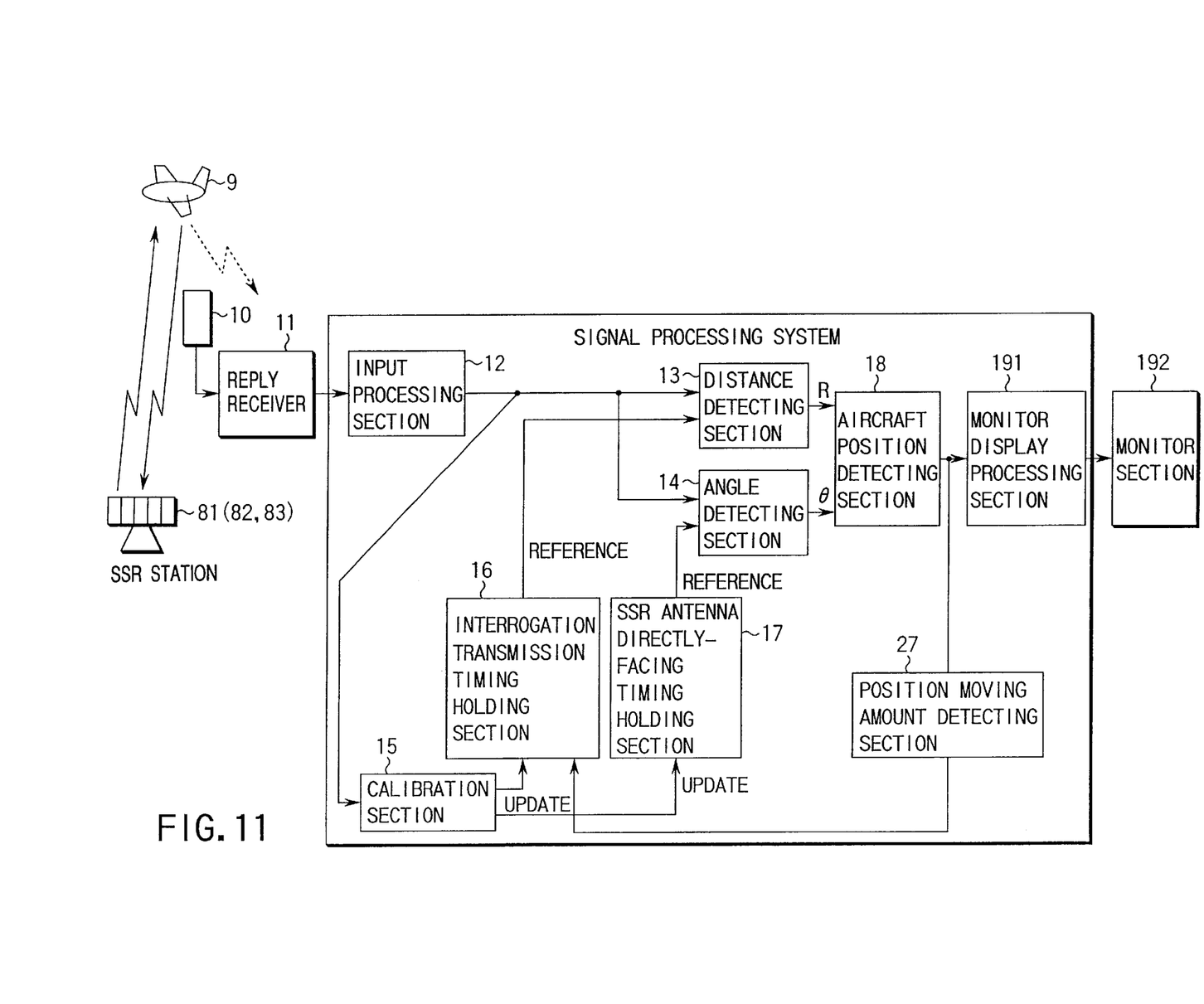
FIG. 11 is a block diagram illustrating yet another embodiment of the present invention.
Figure 12:
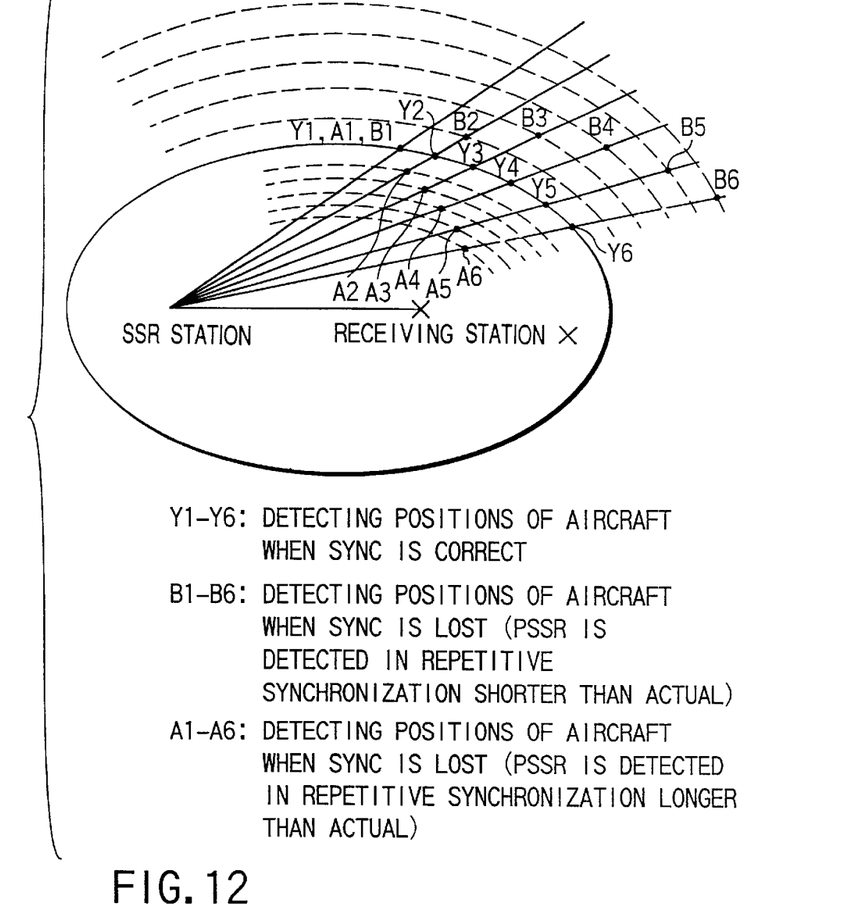
FIG. 12 is a diagram for explaining the concept of correction processing of the embodiment shown in FIG. 11.

In the embodiment shown in FIG. 11, a self-calibration function is added. A position moving amount detecting section 27 for detecting a position moving amount is connected to the output terminal of an aircraft position detecting section 18, and the output terminal of the position moving amount detecting section 27 is connected to an interrogation transmission timing holding section 16. The position moving amount detecting section 27 detects a position moving amount of an aircraft in one period of the antenna of an SSR station on the basis of the input positional information of the aircraft, and supplies a correction signal, which corresponds to the position moving amount as a correction amount, to the interrogation transmission timing holding section 16. The section 16 holds transmission timing based on the input correction signal and supplies the corrected transmission timing to a distance detecting section 13.

Even in the case where the antenna is constituted of an electronic scanning antenna of a random scan type, an operator can detect a position of an aircraft as in the same manner as above if he or she recognizes the schedules of interrogation waves emitted from the antenna.

As described above, the aircraft receives a plurality of consecutive replies during one scanning per rotation of the antenna of the SSR station or per period of the interrogation wave emitting schedules; however, the reply time of the plurality of consecutive reply is very short and the distance between the aircraft and the SSR station/passive SSR system hardly varies. The beam direction of the SSR station slightly moves in accordance with the antenna rotation timing or the wave emitting schedules. As one scanning for one aircraft by the SSR station, the positions of the aircraft are located at intervals close to the beam widths of the antenna in the azimuth direction on the circumference of a circle whose center corresponds to the SSR station and whose radius corresponds to a slant range. In other words, when the aircraft correctly recognizes transmission timing of interrogation from the SSR station, its positions Y1 to Y6 are located on the circumference of the same ellipse in FIG. 12. If, however, it recognizes the transmission timing incorrectly, its positions are moved and detected as indicated by A1 to A6 or B1 to B6 in FIG. 12 (B1 to B6 indicate the positions moving away from the center). The above position moving amount detecting section 27 generates a correction signal corresponding to a position moving amount of the aircraft as a correction amount of transmission timing and supplies it to the above interrogation transmission timing holding section 16. As described above, the self-calibration can be performed.

As a method for correcting the transmission timing, various types of calibration method as described above can be applied.

The present invention is not limited to the above embodiments. It is needless to say that various changes and modifications can be made without departing from the scope of the subject matter of the present invention.

According to the present invention detailed above, there can be provided a passive SSR system which is simple in configuration and capable of detecting the position of an aircraft with high precision without receiving any interrogation from an SSR station.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A passive SSR system comprising:

reply receiving means for receiving a reply issued from an aircraft in response to an interrogation sent out from an SSR station;

calibration means for detecting transmission timing of the interrogation sent out to the aircraft from the SSR station, antenna directly-facing timing of the SSR station, and interrogation patterns, based on the reply from the aircraft for calibration received by the reply receiving means;

aircraft position detecting means for detecting a position of the aircraft based on the reply and the transmission timing and the antenna directly-facing timing of the SSR station detected by the calibration means; and monitor means for monitoring the position of the aircraft detected by the aircraft position detecting means.

2. The passive SSR system according to claim 1, wherein the calibration means receives a reply which is supplied from at least two aircrafts for calibration to at least three SSR stations storing positional information in advance, and detects transmission timing of an interrogation from each of the SSR stations and directly-facing timing of an antenna of each of the SSR stations based on the reply of the aircrafts.

3. A passive SSR system comprising:

reply receiving means for receiving a reply issued from an aircraft in reply to an interrogation sent out from an SSR station;

calibration means for specifying the aircraft, which sends out the reply to the reply receiving means, based on aircraft position information from ADS (Automatic Dependent Surveillance), and detecting transmission timing of the interrogation sent out to the aircraft from the SSR station, antenna directly-facing timing of the SSR station, and interrogation patterns, based on the reply, a site of the SSR station and the aircraft position information, which are stored in advance;

aircraft position detecting means for detecting a position of the aircraft based on the reply and the transmission timing and the antenna directly-facing timing of the SSR station, which are detected by the calibration means; and monitor means for monitoring the position of the aircraft detected by the aircraft position detecting means.

4. A passive SSR system comprising:

reply receiving means for intercepting a reply issued from an aircraft in reply to an interrogation generated from an SSR station;

calibration means for storing generation time information of the interrogation of the SSR station and directly-facing time of an antenna of the SSR station, which are preset, and detecting transmission timing of the interrogation sent out to the aircraft from the SSR station and antenna directly-facing timing of the SSR station based on time of a common clock;

aircraft position detecting means for detecting a position of the aircraft based on the reply and the transmission timing and the antenna directly-facing timing of the SSR station, which are calculated by the calibration means, and the reply; and monitor means for monitoring the position of the aircraft detected by the aircraft position detecting means.

5. The passive SSR system according to claim 4, wherein the calibration means includes time detecting means for specifying an aircraft, which is sending out a reply to the reply receiving means, based on aircraft position information from ADS (Automatic Dependent Surveillance) and detecting time lag between the reply and the aircraft position information, and the calibration means the corrects time of the common clock based on the time lag and detects the transmission timing of the interrogation sent out to the aircraft from at least the SSR station at the corrected time.

6. A passive SSR system comprising:

reply receiving means for receiving a reply issued from an aircraft in reply to an interrogation sent out from an SSR station;

calibration means for, upon externally receiving transmission time information of an interrogation of the SSR station and antenna directly-facing time information of the SSR station which are based on time of a common clock or receiving a schedule for emitting an interrogation wave from the antenna, synchronizing the transmission time information and the antenna directly-facing time information based on the time of the common clock, and detecting transmission timing of the interrogation sent out to the aircraft from the SSR station and antenna directly-facing timing of the SSR station;

aircraft position detecting means for detecting a position of the aircraft based on the reply and the transmission timing and the antenna directly-facing timing of the SSR station detected by the calibration means; and monitor means for monitoring the position of the aircraft detected by the aircraft position detecting means.

7. The passive SSR system according to claim 6, wherein upon externally receiving the transmission time information of the interrogation of the SSR station and the antenna directly-facing time information of the SSR station, which are based on the time of the common clock, the calibration means synchronizes the transmission time information and the antenna directly-facing time information based on the time of the common clock and detects the transmission timing of the interrogation sent out to the aircraft from the SSR station and the antenna directly-facing timing of the antenna of the SSR station.

8. The passive SSR system according to one of claims 6 or 7, wherein the transmission time information of the interrogation of the SSR station and the antenna directly-facing time information of the antenna of the SSR station externally received by the calibration means and based on the time of the common clock, are supplied from another passive SSR system.

9. The passive SSR system according to any one of claims 1 to 7, further comprising transmission timing correction means for detecting an amount of position movement in an aircraft scanning period of the SSR station of the aircraft position information detected by the aircraft position detecting means and correcting the transmission timing of the interrogation sent out to the aircraft from the SSR station based on the amount of position movement.

10. The passive SSR system according to claim 8, further comprising transmission timing correction means for detecting an amount of position movement in an aircraft scanning period of the SSR station of the aircraft position information detected by the aircraft position detecting means and correcting the transmission timing of the interrogation sent out to the aircraft from the SSR station based on the amount of position movement.

* * * * *